United States Patent [19]
Davis, Jr.

[11] Patent Number: 5,443,578
[45] Date of Patent: Aug. 22, 1995

[54] COMPRESSED NATURAL GAS FUEL TANK FOR VEHICLES

[76] Inventor: William F. Davis, Jr., 148 Auble St., Wadsworth, Ohio 44281

[21] Appl. No.: 62,279

[22] Filed: May 17, 1993

[51] Int. Cl.⁶ .................................................. B60P 3/22
[52] U.S. Cl. .................... 280/834; 280/830; 220/581; 220/592; 410/120
[58] Field of Search ............ 220/562, 581, 592, 4.14, 220/4.15; 280/781, 782, 783, 830, 837, 834; 410/43, 47, 97, 120

[56] References Cited

U.S. PATENT DOCUMENTS

| D. 171,427 | 2/1954 | Snyder | 220/4.14 X |
| 2,530,819 | 11/1950 | Hamlin | 220/4.14 X |
| 2,540,859 | 2/1951 | Birkin | 280/830 X |
| 2,946,598 | 7/1960 | Foster | 280/830 |
| 2,993,551 | 7/1961 | Finley et al. | 280/830 X |
| 4,093,254 | 6/1978 | Ezaki | 280/783 |
| 4,135,724 | 1/1979 | Larsen | 280/830 |
| 4,357,027 | 11/1982 | Zeiflow | 220/4.14 |
| 5,228,585 | 7/1993 | Lutgen et al. | 220/4.14 |

Primary Examiner—Allan N. Shoap
Assistant Examiner—Stephen Cronin
Attorney, Agent, or Firm—Renner, Kenner, Greive, Bobak, Taylor & Weber

[57] ABSTRACT

A compressed natural gas fuel tank for vehicles employing internal combustion engines. A fuel tank of heavy gauge metal is interposed within the vehicle frame as an integral portion thereof. Overlay channel members are welded or otherwise affixed to the tank and then welded or otherwise affixed to the side rails or channel members of the vehicle frame. The tank, of heavy gauge metal and non-circular cross section, is also welded or otherwise appropriately affixed to the vehicle floor. The tank is capable of receiving natural gas at high pressure levels, while also serving structurally as a frame element, providing continuity of the side rail members of the frame, while also serving to further interconnect the vehicle floor with the side rails.

12 Claims, 3 Drawing Sheets

COMPRESSED NATURAL GAS FUEL TANK FOR VEHICLES

TECHNICAL FIELD

The invention herein resides in the art of automotive vehicles and, more particularly, of the type driven by a fuel powered engine. Specifically, the invention relates to a fuel tank for receiving and maintaining compressed natural gas as the fuel for such a vehicle.

BACKGROUND ART

Modern transportation requires the extensive use of over-the-road vehicles such as automobiles, vans, trucks, and the like. Presently, such vehicles are powered by an engine which is fueled by gasoline or diesel fuel. The use of such fuels has given rise to two apparent shortcomings. First, such fuels are in limited supply throughout the world and the international control of such fuels causes their price and availability to be uncertain. A second shortcoming of such fuels is their adverse impact on the environment. It is generally believed that the hydrocarbon gases released from the combustion of gasoline or diesel fuel in an internal combustion engine is environmentally undesirable.

It is know that natural gas is in bountiful supply in the United States and that the burning of such gas is environmentally compatible. It is also known that internal combustion engines can operate efficiently on natural gas. However, the use of natural gas as a vehicle fuel has been constrained by the "range" afforded the vehicle using such fuel. In the past, tanks of compressed natural gas have been placed in the trunk or other storage areas of the vehicle and interconnected with the fuel system for passage to fuel injectors or the like. However, the availability of storage areas in vehicles suitable for receiving such tanks of compressed natural gas is somewhat limited and such limitation necessarily constrains the distance that the vehicle can travel without refueling. Accordingly, the range of vehicles employing natural gas fuel has necessarily been significantly limited in the past.

The prior art has been substantially devoid of the presentation of a vehicle having an internal combustion engine and having fuel tanks provided as an integral portion of the vehicle to serve for holding natural gas fuel for use by the engine. The requirement that the natural gas be introduced into the fuel tanks at high levels of pressure have typically dictated that the tanks be specially designed for simple retention in storage areas of the vehicle, and the prior art has not envisioned a manner for incorporating fuel tanks as a structural portion of the vehicle itself. Indeed, the prior art has not taught fuel tanks of sufficient strength to receive and maintain large volumes of natural gas at high pressure levels, while serving as a structural element of the vehicle. Indeed, the prior art has envisioned the use of natural gas as the fuel for vehicles as being more of a novelty feature for use by vehicle fleets serving a limited area, rather than as a practical means for avoiding the shortcomings inherent in the use of gasoline and diesel fuels.

DISCLOSURE OF INTENTION

In light of the foregoing, it is a first aspect of the invention to provide a compressed natural gas fuel tank for vehicles providing significantly extended capacity over prior art tanks.

Another aspect of the invention is the provision of a compressed natural gas fuel tank for vehicles in which the tank is formed as an integral and structural element of the vehicle frame.

Yet another aspect of the invention is the provision of a compressed natural gas fuel tank for vehicles which is capable of receiving and maintaining large volumes of natural gas at high pressure levels.

Still a further aspect of the invention is the provision of a compressed natural gas fuel tank for vehicles which can be positioned and maintained beneath the vehicle, in an unobtrusive and safe manner.

Still a further aspect of the invention is the provision of a compressed natural gas fuel tank for vehicles which is easy to construct and conducive to implementation with presently existing vehicles by retrofitting the same, and to new vehicles as a new assembly.

The foregoing and other aspects of the invention which will become apparent as the detailed description proceeds are achieved by a compressed natural gas fuel tank assembly for a vehicle, comprising: a tank; first means extending from said tank for engaging a side rail of the vehicle; and second means interengaging said tank and a floor of the vehicle for securing said tank to said floor.

Other aspect of the invention which will become apparent herein are achieved by a compressed gas fuel tank assembly for a vehicle, comprising: a tank positioned within a discontinuity in a side rail of a frame of a vehicle; channel members extending from opposite ends of the tank and being securedly engaged to respective ends of said side rail on opposite sides of said discontinuity; and means securing said tank to a floor of the vehicle.

DESCRIPTION OF DRAWINGS

For a complete understanding of the objects, techniques, and structure of the invention, reference should be made to the following detailed description and accompanying drawings wherein.

BEST MODE FOR CARRYING OUT THE INVENTION

Figure 1:
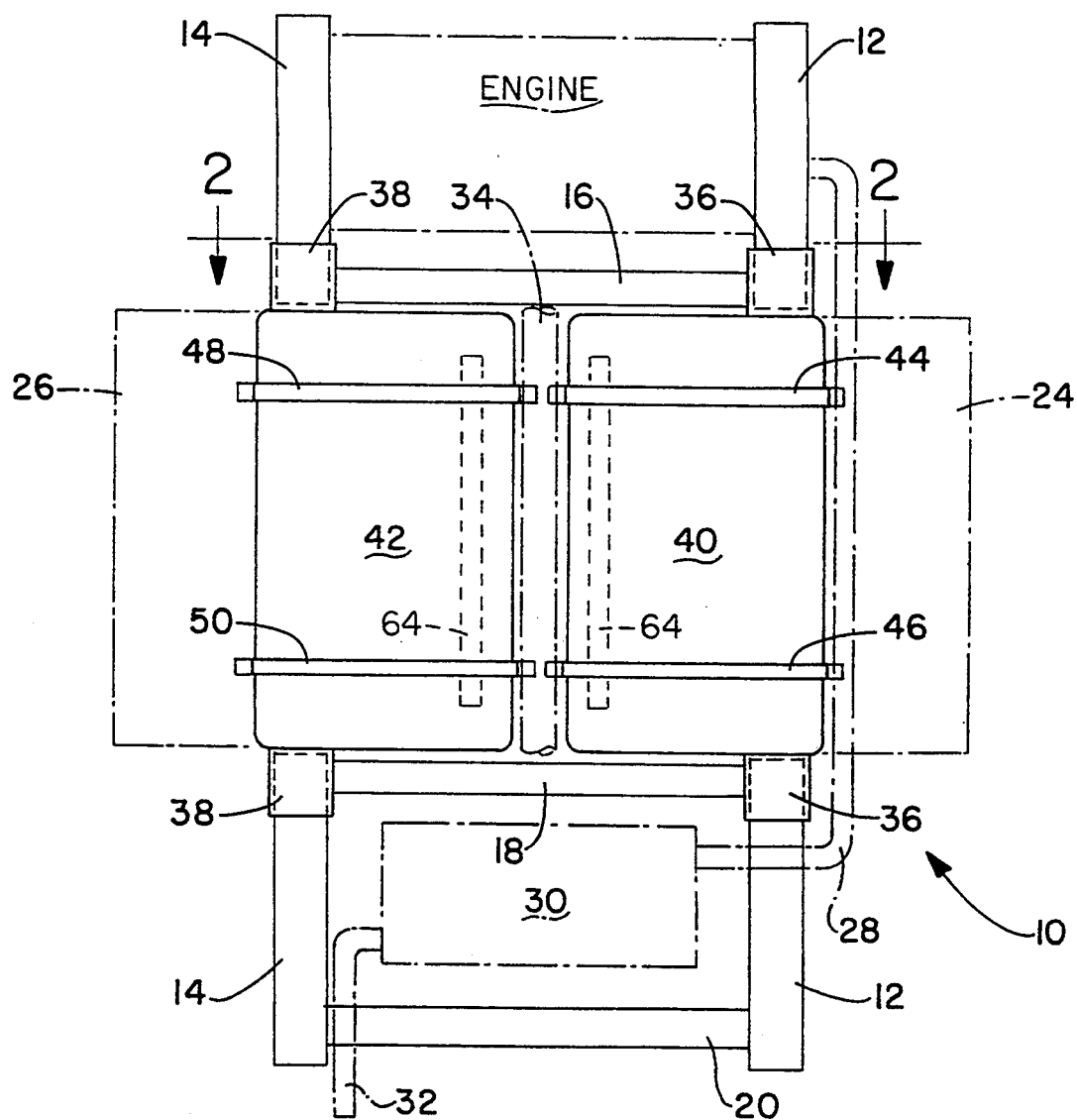
FIG. 1 is bottom plan view of a rear-wheel-drive vehicle showing the natural gas fuel tank of the invention.

Referring now to the drawings and more particularly FIG. 1, it can be seen that a vehicle frame of the rear-wheel-drive type is designated generally by the numeral 10. The frame 10 includes a pair of side rails or members 12, 14 which are interconnected by spaced apart laterally extending cross members 16, 18, 20. Right and left step wells 24, 26 may be provided along each side of the vehicle frame 10 in standard fashion. Also included as a portion of a typical vehicle is an exhaust pipe 28 extending along a side of the frame 10 to interconnect with a muffler 30 from which extends a tailpipe 32. In somewhat standard fashion in a rear-wheel-drive vehicle, a drive shaft 34 extends centrally along the bottom of the frame 10 between a transmission and a differential assembly.

According to the invention, a pair of fuel tanks 40, 42 are fixed beneath the vehicle frame 10 and caused to be an integral portion thereof. In the preferred embodiment of the invention, the tanks 40, 42 are of steel construction, having a thickness on the order of 0.5–1.0 inch. The tanks are rigidly constructed to withstand an internal pressure of the compressed natural gas on the order of 2,000–3,000 psi, and preferably 2,400 psi.

Figure 2:
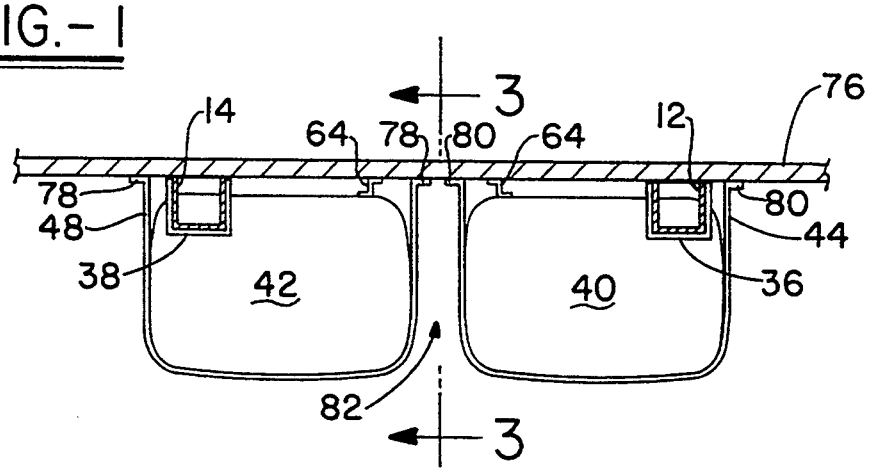
FIG. 2 is an end elevational view, in partial section, taken along the line 2—2 of FIG. 1.
Figure 3:
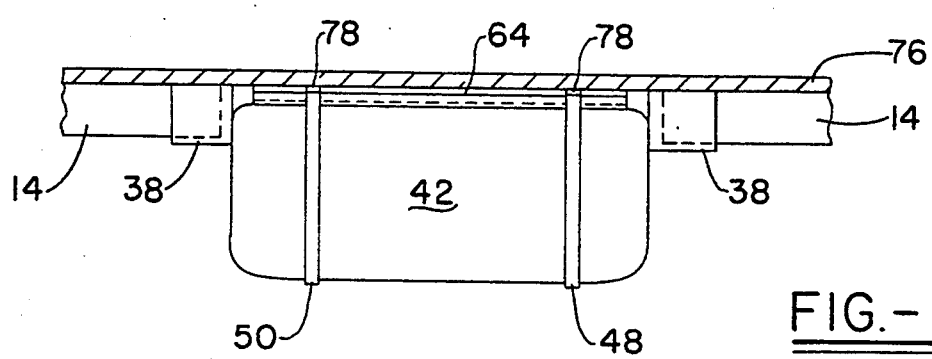
FIG. 3 is a side elevational view, in partial section, taken along the line 3—3 of FIG. 2.

In a standard vehicle construction, each of the side rails or members 12, 14 would be of continuous length. However, according to the instant invention, the side rails 12, 14 are removed at the area receiving the tanks 40, 42, and are structurally replaced by the tanks themselves. As shown in FIGS. 1–3, the overlay frame channel members 36 are welded to or otherwise formed as an integral portion of the tank 40, while the overlay frame channel members 38 are similarly made as an integral portion of the tank 42. The overlay channel members 36, 38 are then received upon respective end portions of the side rails or frame members 12, 14 and welded thereto. In a preferred embodiment of the invention, only horizontal welds are made, to provide appropriate integrity and to prevent crystallization of the weld joints. However, the actual welding and affixing of the frame overlay channel members 36, 38 to the frame members 12, 14 and tanks 40, 42 would be readily perceived and appreciated by those skilled in the art.

It will be appreciated that the instant invention contemplates the channel members 36, 38 receiving the side rails or frame members 12, 14 therein, as shown in the drawings. However, it is also envisioned that the channel members 36, 38 may be received within the channels defined by the side rails 12, 14. In either event, it will be understood by those skilled in the art that the continuous extension of the side rails 12, 14 is effected by the interpositioning of respective tanks 40, 42 which, through the provision of the frame overlay channel members 36, 38, attains side rail construction which is continuous and integral with the tanks 40, 42. Of course, the extent of overlap between the members 36, 38 and the respective side rails 12, 14 determines, to some degree, the overall integrity of the frame assembly 10.

If necessary, the junction of the overlap between the channel members 36, 38 and side rails 12, 14 may be further strengthened by implementing a plate bridging the junction and being affixed to each of the associated channel members 36, 38 and side rails 12, 14. It has been found that a metal stock plate having a thickness on the order of 0.25 inch may be bolted or otherwise secured over the junction for such purposes. Those skilled in the art will appreciate that the side rails 12, 14 are fabricated of steel and have a thickness of approximately 0.125 inch and, accordingly, the channel members 36, 38 are preferably constructed of similar material.

Also presented as a portion of the invention, and adding additional support to the tanks, are straps 44, 46, 48, 50 which are secured to the floor 76 of the vehicle. As shown in FIG. 2, the strap 44 is provided with legs or flanges 80 at the ends thereof, while legs or flanges 78 are provided at the ends of the straps 48. Of course, the straps 46, 50 would have similar flanges at their ends. The flanges 78, 80 may be welded, bolted, or otherwise affixed to the floor 76 of the vehicle, providing further support to the tanks 40, 42.

With further attention to FIGS. 2 and 3, it can be seen that an angle iron 64 is welded or otherwise appropriately attached along the length of each of the respective tanks 40, 42 and is also welded or otherwise appropriately attached to the floor 76. Those skilled in the art will now readily appreciate that the compressed natural gas tanks 40, 42 are not only rendered as an integral portion of the side rails or members 12, 14, but are also rendered as an integral portion of the floor 76, as well. Accordingly, although the side rails or members 12, 14 appear to be discontinuous as a result of the insertion of the tanks 40, 42, the presence of the tanks 40, 42, made of heavy gauge metal as aforesaid, provides increased strength and integrity to the vehicle frame 10.

It is further presented that the tanks 12, 14 are preferably of non-circular cross section. By providing such tanks with a substantially rectangular cross section, the volume of the tanks is maximized for given dimensional constraints without sacrificing strength or rigidity. In the preferred embodiment, the edges of the tanks are rounded, as shown.

Figure 4:
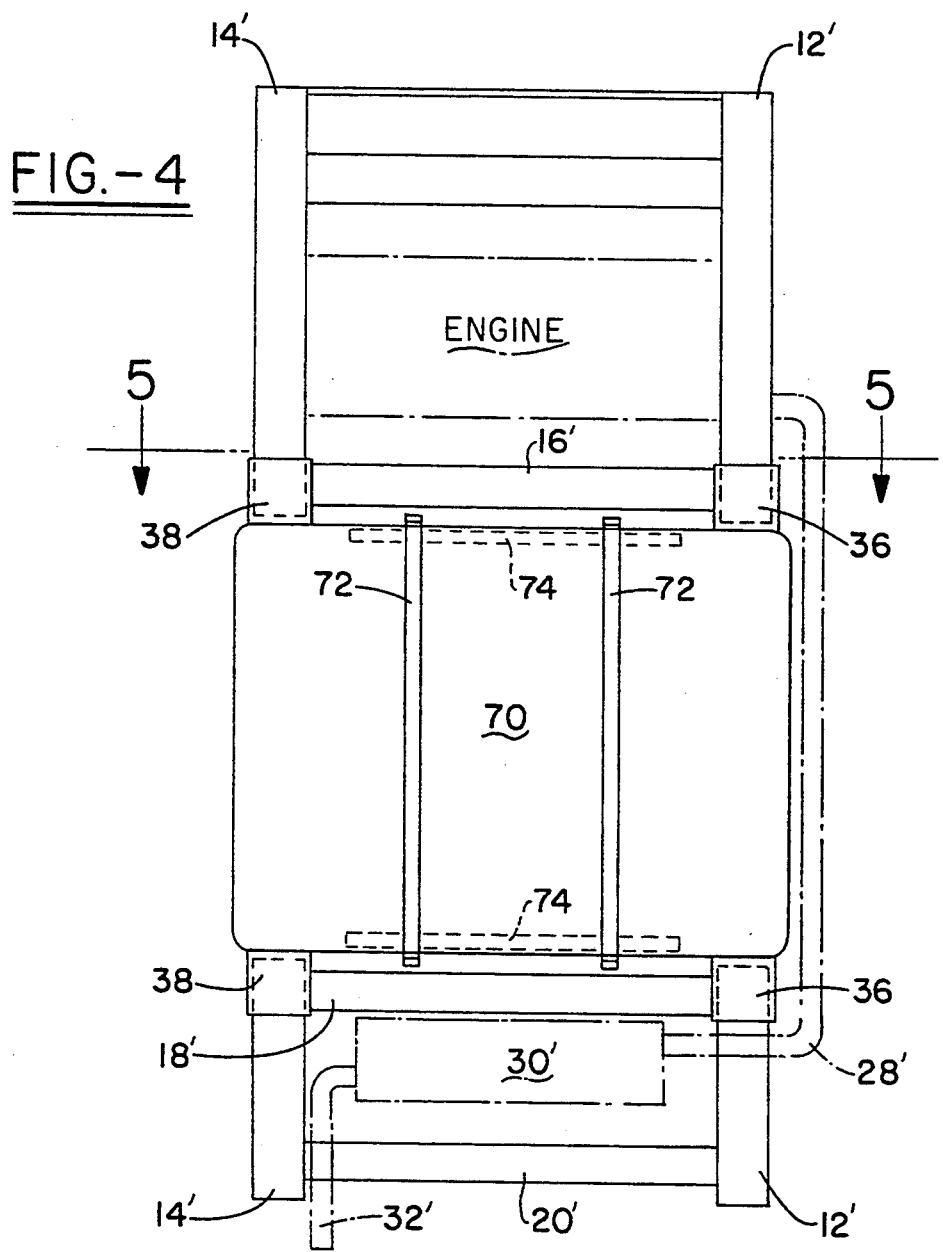
FIG. 4 is a bottom plan view of a front-wheel drive vehicle showing the implementation of the natural gas fuel tank of the invention.
Figure 5:
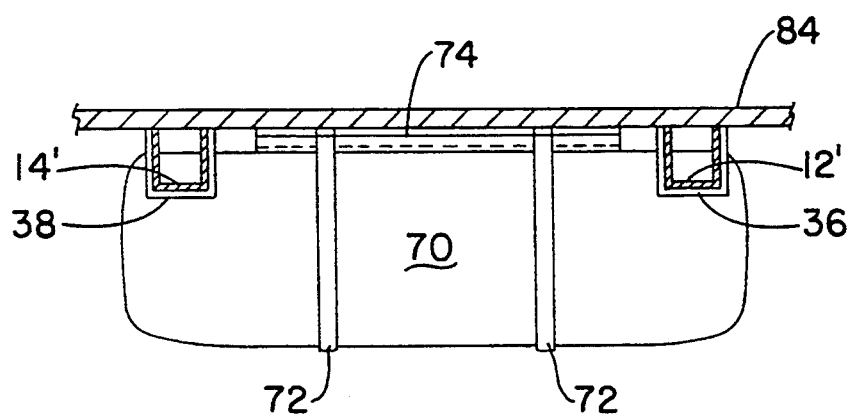
FIG. 5 is an end elevational view, in partial section, of the embodiment shown in FIG. 4 taken along the line 5—5.

With reference now to FIGS. 4 and 5, it can be seen that the concept of the invention can be readily implemented with front-wheel-drive vehicles. Here, vehicle frame side rails or members 12', 14' are interconnected with cross members 16', 18', 20', with an exhaust pipe 28', muffle 30', and tailpipe 32' provided in ordinary fashion. Since no drive shaft is required for the front wheel drive vehicle, a single fuel tank 70, of substantial size, can be employed. Again, in the preferred embodiment of the invention the structure of the tank 70 would be similar to that of the tanks 40, 42, using substantially the same materials, welding techniques, and the like to assure the necessary structural integrity and ability to withstand the pressures aforesaid.

As shown in FIGS. 4 and 5, frame overlay channel members 36, 38 are again welded to the tank 70 and to respective side rail members 12, 14. In this instance, the tank 70 not only provides for a continuity of the respective side rail member 12, 14, but also serves to interconnect them as well. Additionally, straps 72 are affixed to the floor 84 of the vehicle as by welding, bolting, or the like, and also serve to provide vertical support for the tank 20. Also included are angle irons 74 traversing center portions fore and aft of the tank 70, the same being welded to both the tank 70 and to the floor 84. Accordingly, the tank 70 is an integral portion of not only the side rails 12, 14 of the frame, but also provides strength and rigidity to the floor 84, further interconnecting the floor 84 with the remainder of the vehicle frame.

As presented above, the frame overlay channel members 36, 38 may be of such nature as to receive the respective ends of the side rails 12', 14', or they may be so configured as to be received within the channels of the side rails 12', 14'. Both concepts are envisioned as a portion of the instant invention.

Those skilled in the art will readily appreciate that the instant invention may be applied to preexisting vehicles, as well as new ones. In the event that an existing vehicle is to be converted for use of natural gas, the old gas tank may be removed, the side rails or members 12, 14 removed at appropriate areas, and the appropriate tank 70 or tanks 40, 42 be placed beneath the vehicle frame 10 and secured to the side rails 12, 14 or 12', 14' as discussed above. For implementation with new vehicle manufacture, it is contemplated that the side rails 12, 14 and 12', 14' will be manufactured with the appropriate spacing therebetween to receive the appropriate tanks and frame overlay channel members 36, 38 as just presented.

By manufacturing the tanks of the heavy gauge metal as mentioned above, the tanks serve not only as frame members for the vehicle, but are also of sufficient strength to accept large volumes of natural gas at high pressures, while also being resistant to impacts from crashes or the like. Accordingly, the instant invention provides for structural vehicle integrity, enhanced safety, environmental compatibility, and economy in the operation of a vehicle powered by an internal combustion engine.

Thus it can be seen that the objects of the invention have been satisfied by the structure presented above. While in accordance with the patent statutes only the best mode and preferred embodiments of the invention have been presented and described in detail, it is to be understood that the invention is not limited thereto or thereby. Accordingly, for an appreciation of the true scope and breadth of the invention, reference should be made to the following claims.

What is claimed is.

1. A compressed natural gas fuel tank assembly in combination with a vehicle, comprising:
 a tank; and
 a pair of channel members extending from opposite ends of said tank, said channel members engaging respectively associated ends of a side rail of the vehicle, said side rail being discontinuous between said respectively associated ends thereof, said channel members being fixedly secured to said tank and to said respectively associated ends of said side rail, said tank and said channel members comprising a continuation of said side rail where said side rail is discontinuous, said channel members being welded to said tank and to said respective ends of said side rails.

2. The compressed natural gas fuel tank assembly according to claim 1, further comprising second means interengaging said tank and a floor of the vehicle for securing said tank to said floor, wherein said second means comprises comprising a steel member extending substantially a length of said tank and fixedly secured between said tank and said floor.

3. The compressed natural gas fuel tank assembly according to claim 2, wherein said steel member is welded to said tank and said floor.

4. The compressed natural gas fuel tank assembly according to claim 3, wherein said second means further comprises a strap wrapped about said tank, and secured at opposite ends to the vehicle.

5. The compressed natural gas fuel tank assembly according to claim 4 wherein said strap encompasses said tank in a plane substantially orthogonal to said steel member.

6. The compressed natural gas fuel tank assembly according to claim 5, wherein said tank is non-circular in cross section.

7. A compressed natural gas fuel tank assembly in combination with a vehicle, comprising:
 a tank positioned within a discontinuity in a rail of a frame of a vehicle;
 channel members extending from opposite ends of the tank and being securedly engaged to respective ends of said side rail on opposite sides of said discontinuity; and
 wherein said channel members and ends of said side rail nestingly interengage and said channel members are welded to said tank and to said rail.

8. The compressed natural gas fuel tank assembly according to claim 7, further comprising means securing said tank to a floor of the vehicle, said means comprising an elongated member traversing said tank and being welded to both said tank and the floor.

9. The compressed natural gas fuel tank assembly according to claim 8, wherein said means further comprises a pair of straps encircling the tank and being secured to the floor at opposite ends thereof.

10. The compressed natural gas fuel tank assembly according to claim 9, wherein said tank is of non circular cross section.

11. The compressed natural gas fuel tank assembly according to claim 10, wherein said straps and said elongated member are orthogonal to each other.

12. The compressed natural gas fuel tank assembly according to claim 11, wherein said tank is of metal construction, having a thickness of 0.5–1.0 inch.

* * * * *